United States Patent [19]

Baumbach

[11] 4,325,100

[45] Apr. 13, 1982

[54] LINE PROTECTOR FOR A COMMUNICATIONS CIRCUIT

[75] Inventor: Bertram W. Baumbach, Arlington Heights, Ill.

[73] Assignee: Reliable Electric Company, Franklin Park, Ill.

[21] Appl. No.: 158,913

[22] Filed: Jun. 12, 1980

[51] Int. Cl.[3] .............................................. H02H 9/06

[52] U.S. Cl. .................................... 361/119; 361/124; 361/120; 337/33; 337/34; 337/29; 337/32

[58] Field of Search ............... 361/119, 124, 120, 118; 179/96-99, 174; 337/28, 29, 32-34

[56] References Cited

U.S. PATENT DOCUMENTS

| | | | |
|---|---|---|---|
| 2,546,824 | 3/1951 | Koliss . | |
| 3,255,330 | 6/1966 | MacKenzie et al. | 337/32 |
| 3,849,750 | 11/1974 | Baumbach et al. | 337/32 |
| 3,852,539 | 12/1974 | DeLuca | 179/174 |
| 3,947,730 | 3/1976 | DeLuca et al. . | |
| 4,074,337 | 2/1978 | Debortoli et al. | 361/124 |
| 4,149,211 | 4/1979 | DeHoff | 361/124 X |

*Primary Examiner*—Patrick R. Salce
*Attorney, Agent, or Firm*—Trexler, Bushnell & Wolters, Ltd.

[57] ABSTRACT

A line protector has a housing with coaxial surge voltage arresters, line terminals and a ground terminal. One line terminal is substantially at one end of the cavity of the housing while the other line terminal extends substantially the full length of the cavity of the housing. The ground terminal extends from between the arresters to said one end of the housing cavity. Each terminal projects from the housing at said one end. The three terminals are insultated from the arresters by barrier walls in the housing. A cover closes a side opening in the housing through which the components of the protector are inserted.

9 Claims, 10 Drawing Figures

LINE PROTECTOR FOR A COMMUNICATIONS CIRCUIT

BACKGROUND OF THE INVENTION

This invention relates to line protectors for communications circuits, and more particularly to a protector commonly referred to as a central office protector. Protectors of this type are used to protect inside plant equipment from surge voltages on incoming lines.

Many central office protectors that are being installed are of a design which eliminates the use of heat coils in the line circuit. These heat coils become heated in an overcurrent condition on the line, and the heat generated by the coil is utilized to melt a solder element that releases some kind of mechanism to cause the line to become grounded. Overcurrent faults on the line are frequently the result of a power line causing an excessive voltage on the telephone line. However, many telephone installations are in the form of underground cable systems where they are isolated from power lines; therefore, the need for overcurrent protection in the form of heat coils is generally not necessary in those cases.

Another problem with central office installations is that of space. With constantly expanding telephone usage it becomes more and more important to provide for a protector module termination system that utilizes a minimum amount of floor space. Thus it is important that the protector module be as compact as is reasonably possible.

OBJECTS AND SUMMARY OF THE INVENTION

An object of this invention is to provide a line protector module that has a relatively small cross sectional area, thereby reducing the amount of floor space that is required to mount a large number of modules on companion termination panels.

A further object of this invention is to provide a line protector of the type stated having bifurcated pins for plug-in connection to a terminal board or panel and wherein the line protector contains only three such pins as opposed to a greater number, as has been commonly used.

Yet another object of this invention is to provide a line protector of the type stated which can be plugged into a panel in two 180° positions, thereby making insertion of the protector into the panel somewhat simplified in dark environments.

A still further object of this invention is to provide a line protector of the type stated which can optionally be constructed to accept carbon surge voltage arresters as well as two and three element gas tube surge voltage arresters.

In accordance with the foregoing objects the invention provides a line protector for a communications circuit comprising a dielectric elongated housing open at one side for receiving the components of the protector, said housing having means interior thereof for supporting first and second surge voltage arresters in substantially coaxial relationship with the longitudinal axis of the housing, a first line terminal electrically connected to one arrester, a second line terminal electrically connected to the other arrester, the first line terminal extending substantially from one end of the housing the full length of both arresters and to the other end of the housing, the second line terminal being substantially at the other end of the housing, a ground terminal connected to both arresters intermediate the ends of the housing and extending along only one of the two arresters to said other end of the housing, pins on each of said terminals projecting from said other housing and through slots thereat, and a cover over said opening and having means to retain said components in said housing.

DETAILED DESCRIPTION

Figure 2:
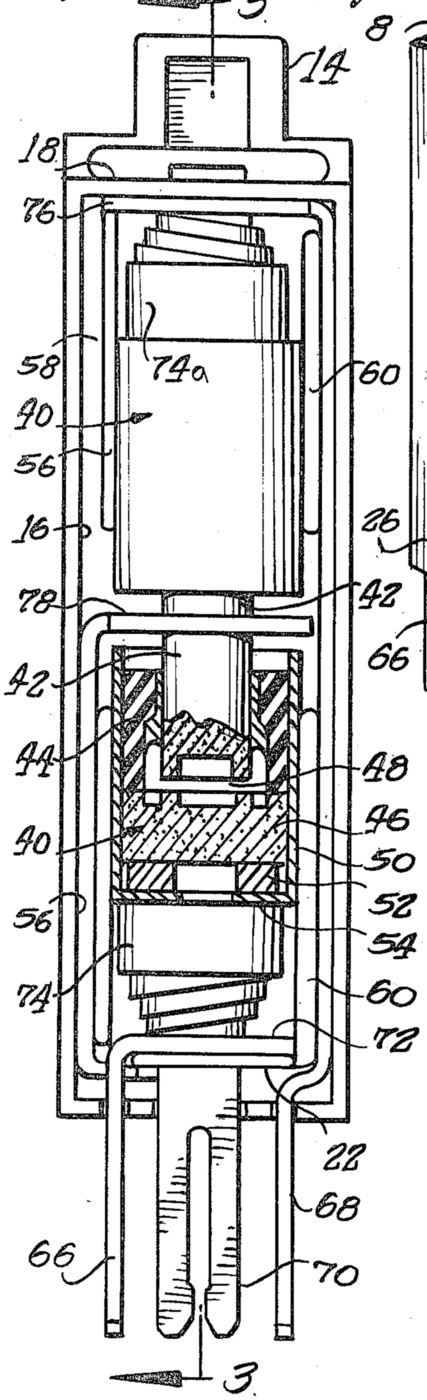
FIG. 2 is a side elevational view, partially in section, of the line protector with the cover removed.
Figure 1:
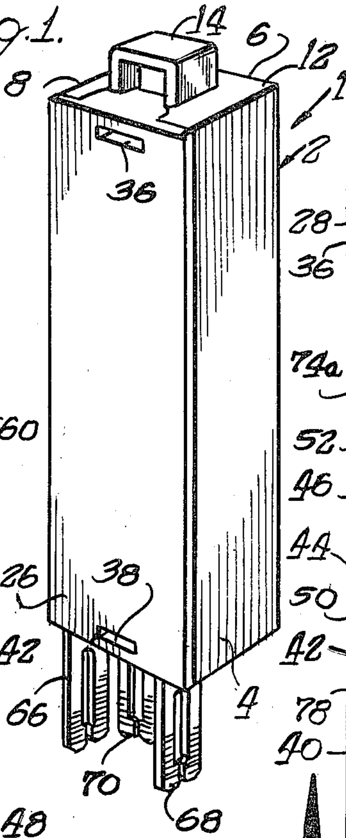
FIG. 1 is a perspective view of a line protector constructed in accordance with embodying the present invention.

Referring now in more detail to the drawing, 1 designates a line protector comprising a dielectric plastic housing 2 that is of rectilinear form. The housing 2 has sidewalls 4,6,8 and opposed end walls 10,12. The upper end wall 12 integrally includes a handle 14 by which the protector 1 may be grasped. At the side of the housing 2 that is opposite to the wall 6 there is an opening 16 through which the components of the protector 1 are inserted into the housing 2 during assembly of the protector 1.

Inwardly of the end wall 12 and adjacent thereto the housing 2 has a transverse flange 18 that projects from the wall 6 and terminates in a tapered locking lip 20. Similarly, there is a transverse flange 22 adjacent to and inwardly of the opposite end wall 10. This flange 22 terminates in a further tapered locking lip 24. A generally rectangular plastic cover 26 is adapted to be removably positioned over the opening 16. The cover 26 has end arms 28,30 which include tapered locking lips 32,34, and the locking lips 32,34 are adapted to interengage the locking lips 20,24 respectively to retain the cover on the housing. Furthermore, the end arms 28,30 are adapted to fit flush with the end walls 10,12. The cover 26 also has slots 36,38 for receiving a screwdriver or like tool whereby the locking lips 32,34 may be pried away from the locking lips 20,24 to facilitate removal of the cover 26.

Disposed within the housing 2 are first and second coaxial surge voltage arresters 40,40 of similar construction. Each surge voltage arrester comprises a carbon rod electrode 42 that is bonded to a surrounding tubular insulator 44. A carbon disc electrode 46 is positioned flush against the end of the insulator 44, and the adjacent end of the rod electrode 42 is recessed within the insulator 44 to provide an arc gap 48. Each arrester is housed within a cylindrical cup 50 such that the rod electrode 42 projects outwardly axially of the open end of the cup 50. An annular solder ring 52 is positioned between each disc electrode 46 and the end wall 54 of the associated cup 50.

Figure 5:
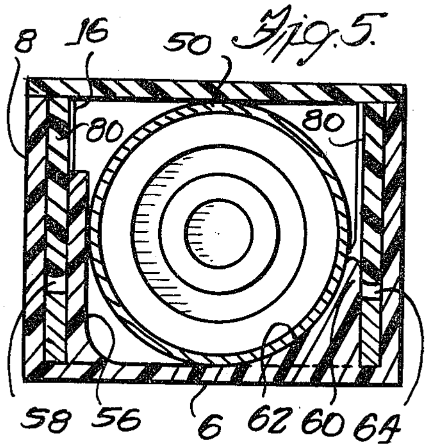
FIG. 5 is a sectional view of an enlarged scale taken along line 5—5 in FIG. 3.

Molded with and projecting from the sidewall 6 are spaced, aligned barrier walls 56,56 which as seen in FIG. 5 terminates short of the opening 16. These barrier walls 56,56 are preferably parallel to the adjacent sidewall 8, leaving narrow or channel spaces 58 therebetween. Adjacent to the sidewall 4 are spaced aligned barrier walls 60,60 which are somewhat shallower then are the barrier walls 56,56. Furthermore the barrier walls 60,60 each has a radius 62,62 presented toward the interior or cavity of the housing.

The several barrier walls 56,60 provide an arrangement for locating or positioning the surge voltage arresters 40,40 coaxially within the housing 4. Thus, the radius 62 in each instance is approximately the same as the exterior radius of the cup 50 such that when the cups 50,50 are assembled within the housing, they will rest on the radii 62,62 and be tangent to the inside surfaces of the barrier walls 56,56. As in the case of the barrier walls 56 narrow spaces or channels 64 are formed between the barrier walls 60 and the sidewall 4.

Also mounted within the housing 2 are first and second metallic line terminals 66,68 and a ground terminal 70. The first or shorter line terminal has a transverse contact portion 72 in the form of a plate that is at right angles to the adjacent part of the terminal 66, and the latter extending outwardly of the end wall 12. The contact portion 72 is confined between the flange 22 and a metal volute spring 74 that is positioned between the contact portion 72 and the end wall 54 of the adjacent cup 50. There is a gap between the flange 22 and the adjacent barrier wall 56 that provides clearance for the terminal 66.

The second or longer line terminal 68 has a portion 76 which is adjacent to the flange 18 and is at right angles to the adjacent part of the terminal 68. Consequently, the two contact portions 72,76 are substantially parallel and are at opposite ends of the cavity of the housing. The contact portion 76 is positioned between the flange 18 and a volute spring 74*a* which is similar to the volute spring 74.

The ground terminal 70 has its transversely extending contact portion 78 intermediate and parallel to the contact portions 72,76. Moreover, the contact portion 78 is engaged on opposite sides thereof by the ends of the respective rod electrodes 42,42.

It will be seen that the long line terminal 68 is disposed in the channels 64, namely between the barrier walls 60 and the sidewall 4. In like manner the ground terminal 70 is positioned in one of the channels 58, and in addition the flange 22 separates the ground terminal 70 from the short line terminal 66. Thus, the several barrier walls, which may include the flange 22, serve to insulate the terminals from short-circuiting contact with the cups 50 of the surge voltage arrester units or from the volute springs 74,74*a*.

The plastic cover 26 cooperates with the housing 4 to retain the line terminals and ground terminal as well as the surge voltage arresters within the housing. Accordingly, the cover is integrally formed with projections 80 which fit into the channels 58,60 over the terminals 68,70. Moreover, the contact portions 72,76, 78 are sized for engagement with or a close fit with the cover 26. The projections 80 also aid in rigidifying or strengthening the cover 26.

Figure 4:
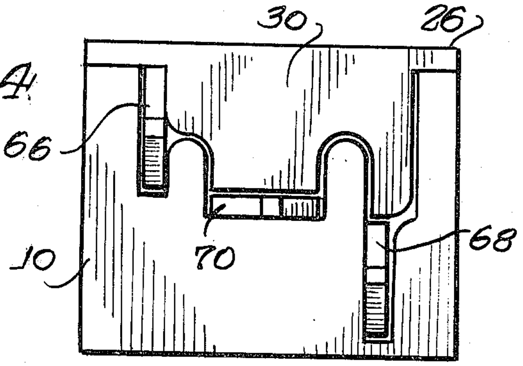
FIG. 4 is a lower end view of the protector on an enlarged scale.
Figure 6:
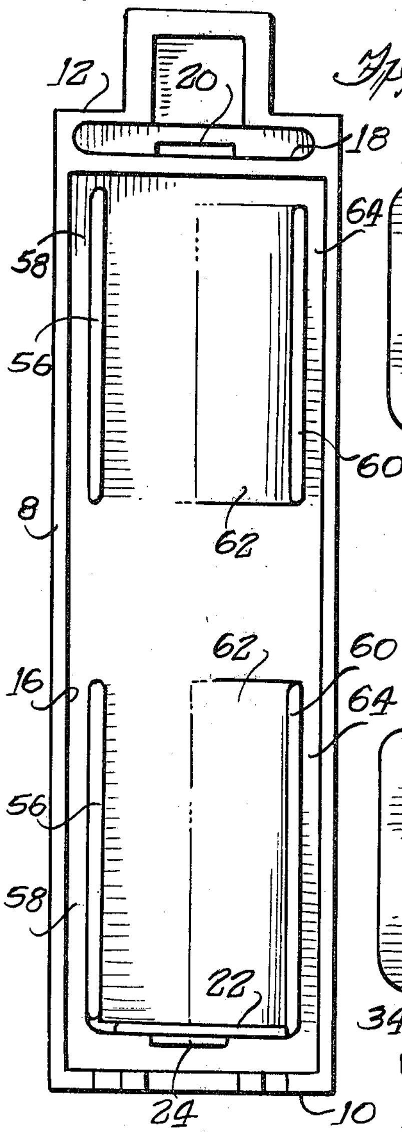
FIG. 6 is a side view of the housing with the cover and the component parts of the protector removed for purposes of showing the interior construction of the housing.
Figure 7:
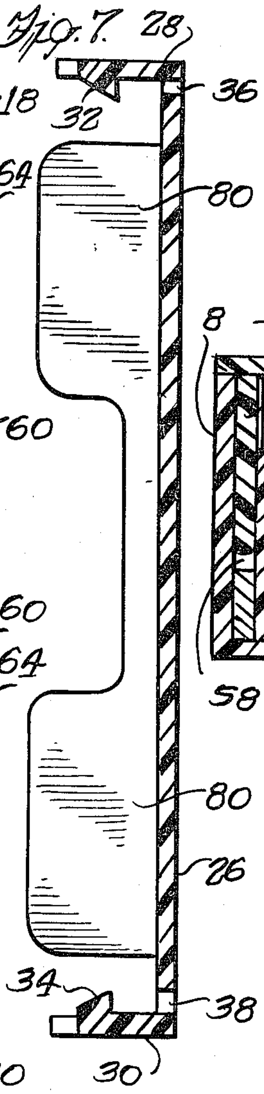
FIG. 7 is a side elevational view of the housing cover, partially broken away and in section.

As is best seen in FIG. 4, the end wall 10 cooperates with the end arm 30 of the cover 26 to provide openings through which the contacts 66,68,70 project. These projected parts of the contacts are in the form of pins that are flat bifurcated members which are adapted to plug into appropriately shaped terminals, such as terminals of the flat blade type. Alternatively, these bifurcated or "tuning fork" contacts could be replaced with flat blade type terminals, as may be desired. In any event, the outwardly projected parts of the terminals 66,68,70 are symmetrical in the sense that the module 1 may be plugged into a panel in two 180° positions. Pin portions of terminals 66,68 are parallel while the pin portion of the ground terminal 70 is at right angles to the pin portions of terminals 66,68.

Figure 3:
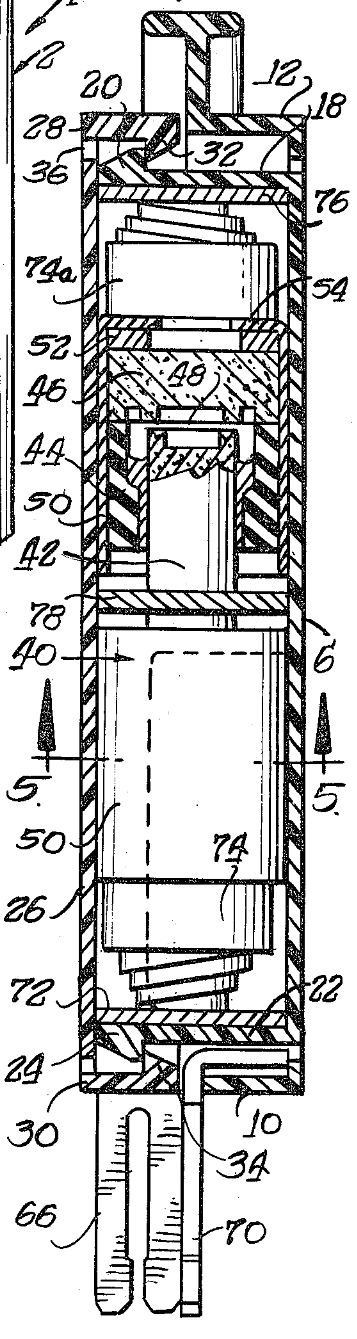
FIG. 3 is a sectional view taken along line 3—3 of FIG. 2 but with the cover in place.

With the cover 26 removed, it is a simple matter to assemble the parts of the protector module through the side opening 16. In the assembled protector there is provided an over-voltage protection from each pin 66 or 68 through one of the surge voltage arresters to the ground terminal 70. For instance, considering FIG. 2, a circuit is formed between the line terminal 66 and the ground terminal 70 through the cup 50, the solder 52, the disc electrode 46, the air gap 48, and the rod electrode 42. Consequently, a surge of sufficient voltage to cause an arc across gap 48 will be grounded through the terminal 70. A sustained arcing will generate sufficient heat to melt the solder 52, whereupon the volute spring 74 will press the edge of the cup 50 that is opposite to the end wall 40 into direct contact with the portion 78 of the ground terminal 70. Surge protection for over voltages on the line to which the terminal 68 is connected is effected through the other surge voltage arrester, shown in cross section in FIG. 3.

Figure 8:
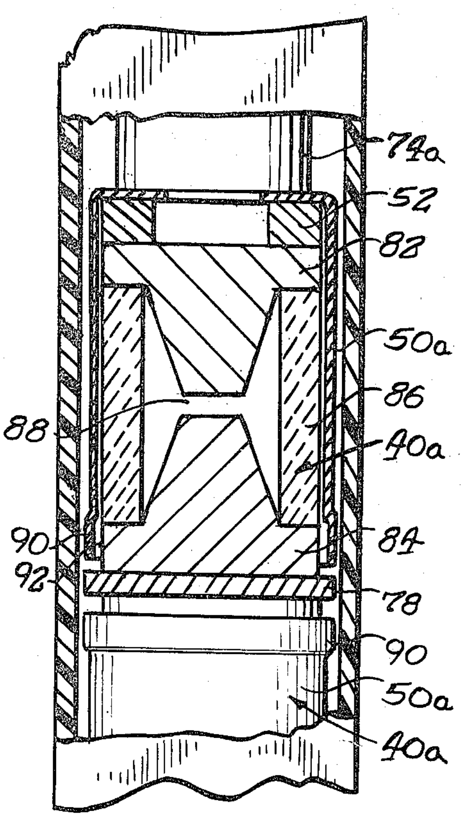
FIG. 8 is a modified form of line protector utilizing two element gas tube surge voltage arresters.

FIG. 8 shows a modified form of the invention which is identical to the form of the invention previously described except that each surge voltage arrester 40*a*,40*a* is of the gas tube type, the gas tubes being coaxial. Typically, the gas tube comprises opposed electrodes 82,84 that are separated by an insulating tube 86 to define a gap 88 which breaks down under surge voltage conditions. The cup 50*a* that contains the arrester may, however, be formed with an enlarged or flared skirt 90 at one end thereof to define a secondary arc gap 92, which is in an air gap, between the annular skirt 90 and the adjacent surface of the electrode 84. The gap 92 may have a breakdown voltage of about a thousand volts, more or less, to provide secondary surge voltage protection in the event that the gas tube fails due to venting.

Figure 9:
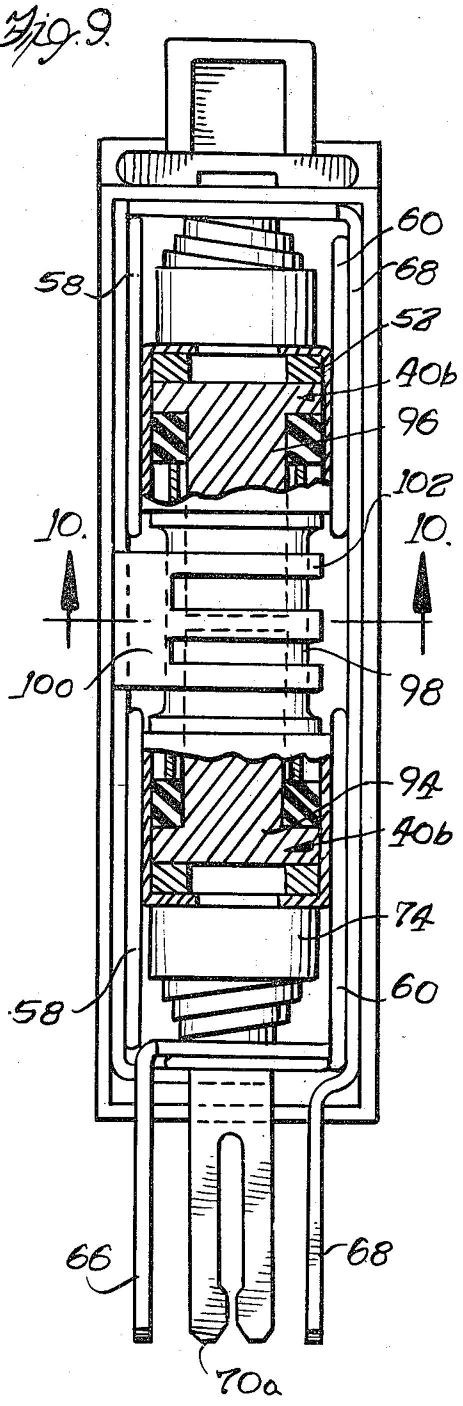
FIG. 9 is a further modified form of the invention using a three-element gas tube surge voltage arrester.
Figure 10:
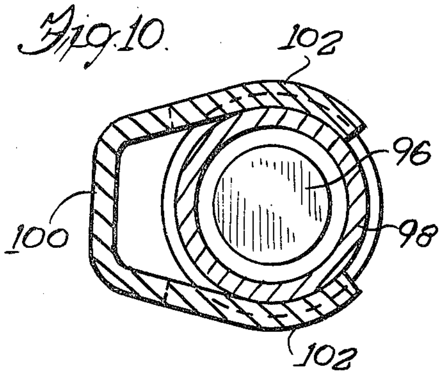
FIG. 10 is a fragmentary sectional view taken along line 10—10 of FIG. 9.

FIGS. 9 and 10 show a further modified form of the invention which is similar to the forms previously described except that the first and second surge voltage arresters 40*b*, 40*b* are in the form of a three element gas tube. This gas tube comprises two coaxial line electrodes 94,96 which are insulated from each other and from a center coaxial cylindrical ground electrode 98. The ground terminal 70*a* is modified to provide a metal center clip portion 100 that has a number of spring fingers 102 that partially surrounds and grips the center-ground electrode 90. Consequently, a surge voltage on line terminal 66 will result in an arc across the gap between the electrodes 94,98, and the surge will be grounded through the ground electrode 70*a*. In like manner a surge voltage on line terminal 68 will be grounded through the arc gap between the electrodes 96,98. Back up protection in the form of a secondary air gap may also be embodied into the device of FIG. 9 in a manner shown by the arrangement of FIG. 8.

What is claimed is:

1. A line protector for a communications circuit comprising a dielectric elongated housing open at one side for receiving the components of the protector, said housing having means interior thereof for supporting first and second surge voltage arresters in substantially coaxial relationship with the longitudinal axis of the housing, a first line terminal electrically connected to one arrester, a second line terminal electrically connected to the other arrester, the first line terminal extending from one end of the housing the full length of both arresters and to the other end of the housing, the second line terminal being substantially at said other end of the housing, a ground terminal connected to both arresters intermediate the ends of the housing and extending along only one of the two arresters to said other end of the housing, pins on each of said terminals projecting from said other housing end through slots thereat, and a cover over said opening and having means to retain said components in said housing.

2. A line protector according to claim 1 in which a plurality of the terminals are in spaces defined at least in part by barrier walls that insulate the terminals from short-circuiting contact with the arresters.

3. A line protector according to claim 2 in which said pins are flat bifurcated members.

4. A line protector for a communications circuit comprising a dielectric housing having an elongated cavity with opposite ends, a first line terminal having a contact portion substantially at one end of the cavity, said first line terminal extending longitudinally of said cavity from said contact portion to the other end of the cavity and having a pin portion projecting outwardly of the housing adjacent to said other end, a second line terminal having a contact portion substantially at said other end of the cavity, said second line terminal having a pin portion projecting outwardly of the housing adjacent to said other end, a ground terminal having a single contact portion located intermediate the contact portions of said line terminals, said ground terminal extending from its contact portion longitudinally of said cavity to said other end and having a pin portion projecting outwardly of the housing adjacent to said other end whereby to provide three side-by-side pin portions of the respective terminals, a first surge voltage arrester in said housing and having opposed electrodes, one electrode being electrically connected to the contact portion of one line terminal, and a second surge voltage arrester in said housing and having opposed electrodes, one electrode being electrically connected to the contact portion of the other line terminal, the surge voltage arresters being juxtaposed longitudinally of said housing in substantially end-to-end relation and on opposite sides of the contact portion of the ground terminal and with said ground terminal contact portion electrically connected to the other electrode of each surge voltage arrester so as to provide surge voltage protection from each line terminal to said ground terminal, each of said line terminal contact portions being at an end of its associated terminal and extending transversely of said cavity.

5. A line protector according to claim 4 in which said ground terminal and said first line terminal are insulated from short-circuiting contact with at least one of said arresters by barrier walls in the housing.

6. A line protector according to claim 4 in which said housing has an open side for receiving said terminals and said arresters, and there is a cover closing said open side, said cover having projections for retaining a plurality of said terminals in channels in said housing.

7. A line protector according to claim 4 in which said surge voltage arresters are gas tubes.

8. A line protector according to claim 4 in which said surge voltage arresters comprise a three electrode gas tube having one electrode electrically connected to the contact portion of the first line terminal, another electrode electrically connected to the contact portion of the second line terminal, and a third electrode electrically connected to said contact portion of the ground terminal.

9. A line protector according to claim 4 in which said surge voltage arresters each has an air gap between its electrodes.

* * * * *